US007779362B1

(12) United States Patent
Castrucci et al.

(10) Patent No.: US 7,779,362 B1
(45) Date of Patent: Aug. 17, 2010

(54) METHODS AND APPARATUS FOR SELECTING OBJECTS BY STATE

(75) Inventors: Adam S. Castrucci, Ottawa (CA); Jason R. Alward, Ottawa (CA); John P. Brinkman, Ottawa (CA)

(73) Assignee: Adobe Systems Inc., San Jose, CA (US)

( * ) Notice: Subject to any disclaimer, the term of this patent is extended or adjusted under 35 U.S.C. 154(b) by 951 days.

(21) Appl. No.: 11/219,022

(22) Filed: Sep. 2, 2005

(51) Int. Cl.
*G06F 15/177* (2006.01)
(52) U.S. Cl. .................... 715/765; 715/763; 715/835
(58) Field of Classification Search ................. 715/812, 715/518, 502, 517, 763, 762, 788, 866, 500, 715/731, 813
See application file for complete search history.

(56) References Cited

U.S. PATENT DOCUMENTS

| | | | | |
|---|---|---|---|---|
| 4,686,522 A | * | 8/1987 | Hernandez et al. | 345/160 |
| 4,788,659 A | * | 11/1988 | Berry et al. | 715/817 |
| 4,951,227 A | * | 8/1990 | Todd | 345/660 |
| 5,101,436 A | * | 3/1992 | DeAguiar et al. | 382/241 |
| 5,123,087 A | * | 6/1992 | Newell et al. | 715/862 |
| 5,133,052 A | * | 7/1992 | Bier et al. | 715/530 |
| 5,220,675 A | * | 6/1993 | Padawer et al. | 715/826 |
| 5,317,687 A | * | 5/1994 | Torres | 715/823 |
| 5,335,320 A | * | 8/1994 | Iwata et al. | 717/110 |
| 5,404,439 A | * | 4/1995 | Moran et al. | 715/814 |
| 5,444,836 A | * | 8/1995 | Hollingsworth et al. | 345/634 |
| 5,459,831 A | * | 10/1995 | Brewer et al. | 715/853 |
| 5,463,722 A | * | 10/1995 | Venolia | 345/662 |
| 5,485,565 A | * | 1/1996 | Saund et al. | 345/442 |
| 5,559,692 A | * | 9/1996 | Telingator et al. | 705/8 |
| 5,572,639 A | * | 11/1996 | Gantt | 345/651 |
| 5,704,028 A | * | 12/1997 | Schanel et al. | 345/440 |
| 5,742,836 A | * | 4/1998 | Turpin et al. | 715/507 |
| 5,760,768 A | * | 6/1998 | Gram | 715/747 |
| 5,796,402 A | * | 8/1998 | Ellison-Taylor | 715/792 |
| 5,838,317 A | * | 11/1998 | Bolnick et al. | 715/764 |
| 5,873,106 A | * | 2/1999 | Joseph | 715/506 |
| 5,969,717 A | * | 10/1999 | Ikemoto | 715/762 |
| 5,999,664 A | * | 12/1999 | Mahoney et al. | 382/305 |
| 6,035,305 A | * | 3/2000 | Strevey et al. | 707/104.1 |
| 6,055,550 A | * | 4/2000 | Wallack | 715/229 |
| 6,208,337 B1 | * | 3/2001 | Zimmerman et al. | 715/866 |
| 6,278,450 B1 | * | 8/2001 | Arcuri et al. | 715/763 |
| 6,320,601 B1 | * | 11/2001 | Takasu et al. | 715/764 |
| 6,356,279 B1 | * | 3/2002 | Halstead et al. | 345/619 |
| 6,380,954 B1 | * | 4/2002 | Gunther | 715/764 |
| 6,456,305 B1 | * | 9/2002 | Qureshi et al. | 715/800 |

(Continued)

OTHER PUBLICATIONS

Alexander, Steven, Best Practice Guide for Exporting Solids from Unigraphics Using STEP May 28, 1998, Declo Electronic Systems Engineering IT.*

*Primary Examiner*—Boris Pesin
(74) *Attorney, Agent, or Firm*—Chapin IP Law, LLC

(57) ABSTRACT

A system selects objects within a graphical user interface by displaying a plurality of objects within the graphical user interface. Each object has an associated set of properties. The system receives a selection condition defining a relationship to be met between properties of an object, and then applies the selection condition to the associated set of properties of each of the plurality of objects to identify a set of selection objects in the plurality of objects that have an object state defined by properties that match the relationship defined by the selection condition. The system then identifies each object in the set of selection objects.

22 Claims, 6 Drawing Sheets

U.S. PATENT DOCUMENTS

| | | | |
|---|---|---|---|
| 6,459,442 B1* | 10/2002 | Edwards et al. | 715/863 |
| 6,504,544 B1* | 1/2003 | Hollingsworth et al. | 345/467 |
| 6,526,550 B1* | 2/2003 | Badding et al. | 716/5 |
| 6,562,077 B2* | 5/2003 | Bobrow et al. | 715/517 |
| 6,667,750 B1* | 12/2003 | Halstead et al. | 715/788 |
| 6,684,385 B1* | 1/2004 | Bailey et al. | 717/109 |
| 6,868,524 B1* | 3/2005 | Fushiki et al. | 715/529 |
| 7,000,188 B1* | 2/2006 | Eustace | 715/716 |
| 7,000,197 B1* | 2/2006 | Bou et al. | 715/812 |
| 7,188,309 B2* | 3/2007 | Simmons et al. | 715/517 |
| 7,196,712 B2* | 3/2007 | Rajarajan et al. | 345/619 |
| 7,257,776 B2* | 8/2007 | Bailey et al. | 715/788 |
| 2002/0075290 A1* | 6/2002 | Rajarajan et al. | 345/700 |
| 2004/0056875 A1* | 3/2004 | Jaeger | 345/700 |
| 2004/0205624 A1* | 10/2004 | Lui et al. | 715/525 |
| 2004/0261037 A1* | 12/2004 | Ording et al. | 715/788 |
| 2005/0034068 A1* | 2/2005 | Jaeger | 715/517 |
| 2005/0039122 A1* | 2/2005 | Meadows | 715/523 |
| 2005/0108620 A1* | 5/2005 | Allyn et al. | 715/500 |
| 2005/0172224 A1* | 8/2005 | Kobashi et al. | 715/517 |
| 2005/0172226 A1* | 8/2005 | Kobashi et al. | 715/518 |
| 2006/0117255 A1* | 6/2006 | Seeler | 715/520 |
| 2007/0028165 A1* | 2/2007 | Cole | 715/517 |

* cited by examiner

METHODS AND APPARATUS FOR SELECTING OBJECTS BY STATE

BACKGROUND

Conventional computerized devices, such as personal computers, laptop computers, and the like utilize graphical editors (i.e., web page editors, document editors, etc.) that allow users to make global modifications to objects (i.e., text objects, buttons, graphical elements, etc.) within the graphical editors. For example, within a document editor, a user can select all the text contents (within a document being edited within the document editor) and globally change the font of the text within the document from the existing font(s) to a new font. That is, all the fonts of the text within the document, even if the fonts are different within various text blocks within the document, can be globally changed to a single common font. The resultant effect is all the text contents are converted to the new font, regardless of the font with which the text contents were previously formatted. Graphical editors also allow users to selectively modify text contents within the document being edited within the document editor. For example, a document editor allows a user to globally change any instance of a word (or phrase). The user can execute a command to 'replace all' instances of, for example, the word "president" with "precedence". Or, a user can execute a command to 'replace all' instances of, for example, the phrase "for the people" with "of the people". Such select-all and find-and-replace features are common in conventional software applications.

SUMMARY

Conventional technologies for selecting objects within a document or other content editor suffer from a variety of deficiencies. In particular, conventional technologies for selecting objects within a document editor are limited in that a user does not have the ability to select objects within a document editor based on a relationship between the properties of the individual objects within the document editor. For example, if a user wishes to select all objects that are spaced too close together, and globally modify these objects (i.e., arrange the objects with more space between each object), there is no conventional method for performing this task. Instead, the user would have to individually select each of those objects that are too close to each other using his or her cognitive judgment about the placement of such objects, and then perform an action on the selected objects to correct the problem. In a large document, such as a large catalog for a retailer, this effort would require a significant amount of time and manual effort to complete. Performing this task manually leaves room for error since the person performing the selection process might unintentionally omit objects that match the selection criteria, and objects that do not match the criteria might be mistakenly chosen (and then mistakenly modified).

Embodiments disclosed herein significantly overcome such deficiencies and provide a system that includes a computer system executing an object selecting process within a graphical user interface. The object selecting process displays a plurality of objects within the graphical user interface. Each object has an associated set of properties. The object selecting process receives a selection condition defining a relationship to be met between properties of an object or objects. In an example configuration, the object selecting process receives a selection condition defining a relationship that must be met between properties of an object or objects. The object selecting process applies the selection condition to the associated set of properties of each of the plurality of objects to identify a set of selection objects in the plurality of objects that have an object state. An object state is generally defined by properties that match the relationship defined by the selection condition. The object selecting process then provides a selection of each object in the set of selection objects. In one example configuration, the object selecting process creates a physical boundary that encompasses the set of selection objects. The physical boundary, identifying those objects that matched the selection condition, allows a user to easily distinguish the set of selection objects from non-selected objects. The user can then perform an action concurrently on the objects identified as the set of selection objects.

During an example operation of one embodiment, suppose a user, modifying a document using a document editor such as web page creation software within a graphical user interface, wishes to select all objects within the document (e.g., within a web page under development) where the text within an object is too large for the container (i.e., a button container, text object container, etc) in which the text resides. The definition of what constitutes text being too large for a container can be encoded within the application to define proportionality between text sizes as a function of overall container boarder sizes, and can be user configurable. Suppose the user wishes to modify those objects accordingly (i.e., either to enlarge the container to accommodate all the text, reduce the amount of text within the container, or reduce the size/font of the text within the container). The size of the text refers to one property of the object, and the size of the container refers to another property of the object. The object selecting process determines which objects match the selection condition chosen by the user (i.e., the selection condition being "select all objects within the document where the text within the object is too large for the container in which the text resides") by detecting proportionality between a first property (i.e., the size of the text) and a second property (i.e., the size of the container). The proportionality indicates a value comparable with a threshold of disparity between a ratio between the first property and the second property. In this example, the first property and second property resides in the same object. In an alternative example configuration, the first property and second property resides in separate objects (e.g. the text can be one object while the container is another). As another example, the threshold of disparity could refer to proximity of two separate objects, indicating those objects are too close to each other.

In one configuration, the user chooses the selection condition from a drop down list of choices. In one example configuration, the user defines, and customizes the selection condition. The selection conditions could be, for example, "select all oversized objects" or "select all undersized objects" or "select all partially (or fully) occluded objects" or "select all unaligned objects" and so forth. An example of an oversized object could be a container (i.e., a text object container or a button object) that is too large for the amount of text (i.e. the text object) encompassed within that container. An example of an undersized object could be a container (i.e., a text object container or a button object) that is too small for the amount of text (i.e. the text object) encompassed within that container, meaning not all of the text is visible within the container.

The object selecting process displays the selection of objects that match the selection condition specified by the user. In one configuration, that selection of objects is identified by grouping those objects together by creating a physical boundary, such as a highlighted box drawn within the graphical user interface, encompassing those objects that meet the selection condition. Alternatively, each object can be highlighted or otherwise designated as being selected (and hence matches the selection condition). The user can then perform an action on all of the objects (that match the selection condition) concurrently, such as enlarging the containers to accommodate the size and amount of text enclosed within those containers, or moving the objects to make them less occluded by other objects, and so forth. This saves the user from individually and manually selecting and modifying the selected objects one by one, and potentially incorporating errors into the document.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods and a computer system that performs an object selecting process within a graphical user interface. The object selecting process displays a plurality of objects within the graphical user interface. Each object has an associated set of properties. The object selecting process receives a selection condition defining a relationship that must be met between properties of an object. The object selecting process applies the selection condition to the associated set of properties of each of the plurality of objects to identify a set of selection objects in the plurality of objects that have an object state. The object state is defined by properties that match the relationship defined by the selection condition. The object selecting process then provides a selection of each object in the set of selection objects. Example advantages provided by the invention are that custom selection conditions can be provided by the system disclosed herein to allow a user to be able to select objects that conform to these custom selections conditions (as opposed to simply being able to select all as in conventional systems). Since the custom selection conditions can be contingent on object state of one or more objects as they interrelate to one another, a user can apply the selection conditions without having to use his or her mental determination is one or more objects meets the selection condition. By providing many different selection conditions available to a user, an application configured with the invention can increase productivity of users and reduce human errors.

Figure 1:
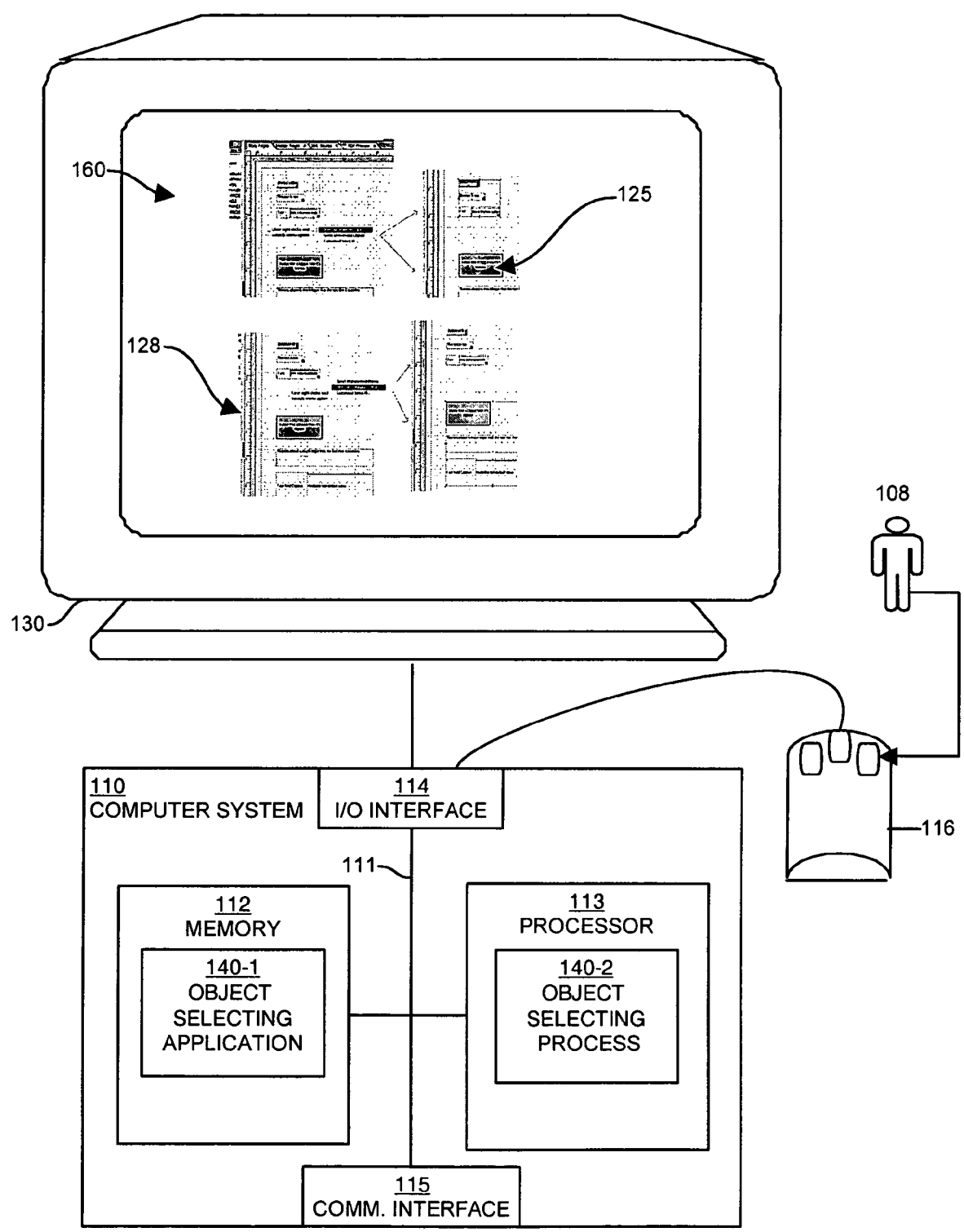
FIG. 1 shows a high-level block diagram of a computer system according to one embodiment disclosed herein.

FIG. 1 is a block diagram illustrating example architecture of a computer system 110 that executes, runs, interprets, operates or otherwise performs a object selecting application 140-1 and object selecting process 140-2 for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the object selecting application 140-1 and process 140-2 provides on the display 130. The graphical user interface 160 displays document editor 128 containing a plurality of objects 125. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an object selecting application 140-1 as explained herein. The object selecting application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the object selecting application 140-1. Execution of object selecting application 140-1 in this manner produces processing functionality in an object selecting process 140-2. In other words, the object selecting process 140-2 represents one or more portions or runtime instances of the object selecting application 140-1 (or the entire object selecting application 140-1) performing or executing within or upon the processor 113 in the computerized device 110 at runtime.

It is noted that example configurations disclosed herein include the object selecting application 140-1 (i.e., in the form of un-executed or non-performing logic instructions and/or data). The object selecting application 140-1 may be stored on a computer readable medium (such as a floppy disk), hard disk, electronic, magnetic, optical, or other computer readable medium. The object selecting application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the object selecting application 140-1 in the processor 113 as the object selecting process 140-2. Those skilled in the art will understand that the computer system 110 may include other processes and/or software and hardware components, such as an operating system not shown in this example.

A display 130 need not be coupled directly to computer system 110. For example, the object selecting application 140-1 can be executed on a remotely accessible computerized device via the network interface 115. In this instance, the graphical user interface 160 may be displayed locally to a user of the remote computer and execution of the processing herein may be client-server based.

Figure 2:
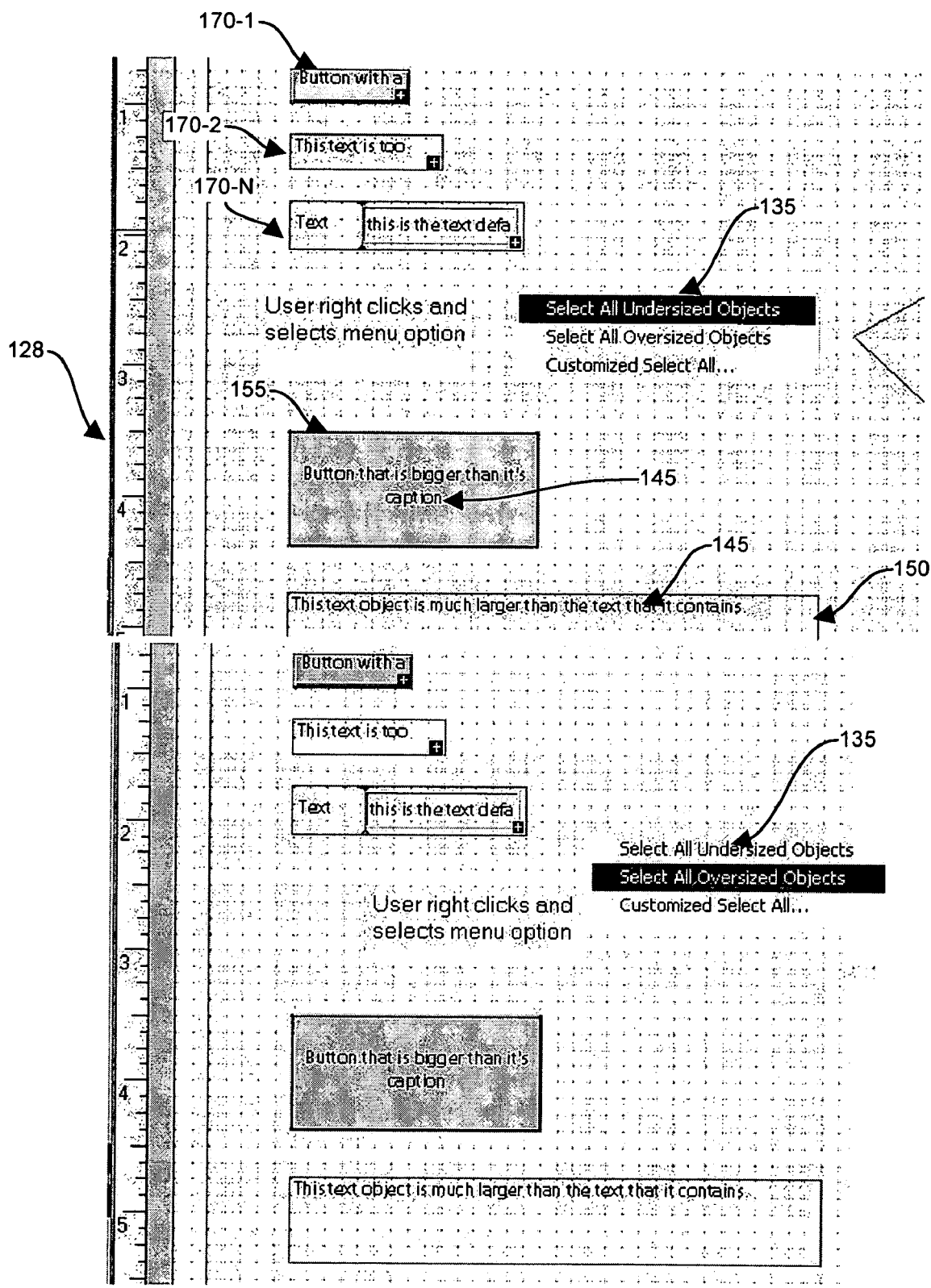
FIG. 2 shows a screen shot of the system of FIG. 1 displaying a document editor containing objects, text objects, text container objects, button objects, and selection conditions within a graphical user interface, according to one embodiment disclosed herein.

FIG. 2 provides an example screen shot of a document editor 128 containing objects 170-N having an associated set of properties, such as text object 145, button object 155, or text container object 150, and a drop down menu displaying example selection conditions 135. This figure will be discussed in more detail in conjunction with flow charts that follow below.

Figure 3:
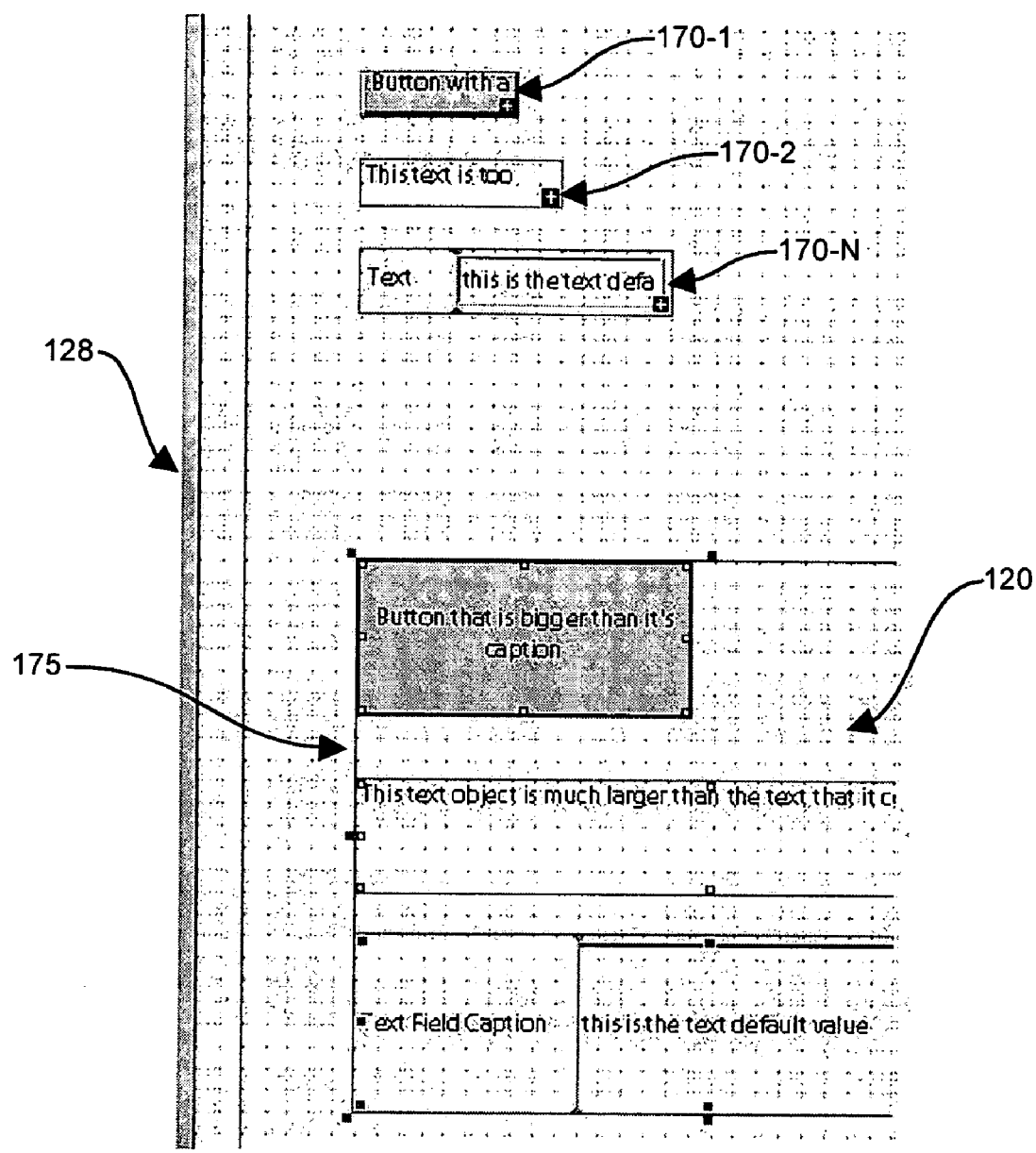
FIG. 3 shows a screen shot of the system of FIG. 1 displaying a document editor containing objects, a set of selection objects identified by a physical boundary within a graphical user interface, according to one embodiment disclosed herein.

FIG. 3 provides an example screen shot of a document editor 128 containing objects 170-N. The object selecting process 140-2 provides a set of selection objects 120 encompassed by a physical boundary 175. This figure will be discussed in more detail in conjunction with flow charts that follow below.

Further details of configurations explained herein will now be provided with respect to a flow chart of processing steps that show the high level operations disclosed herein to perform the object selecting process 140-2.

Figure 4:
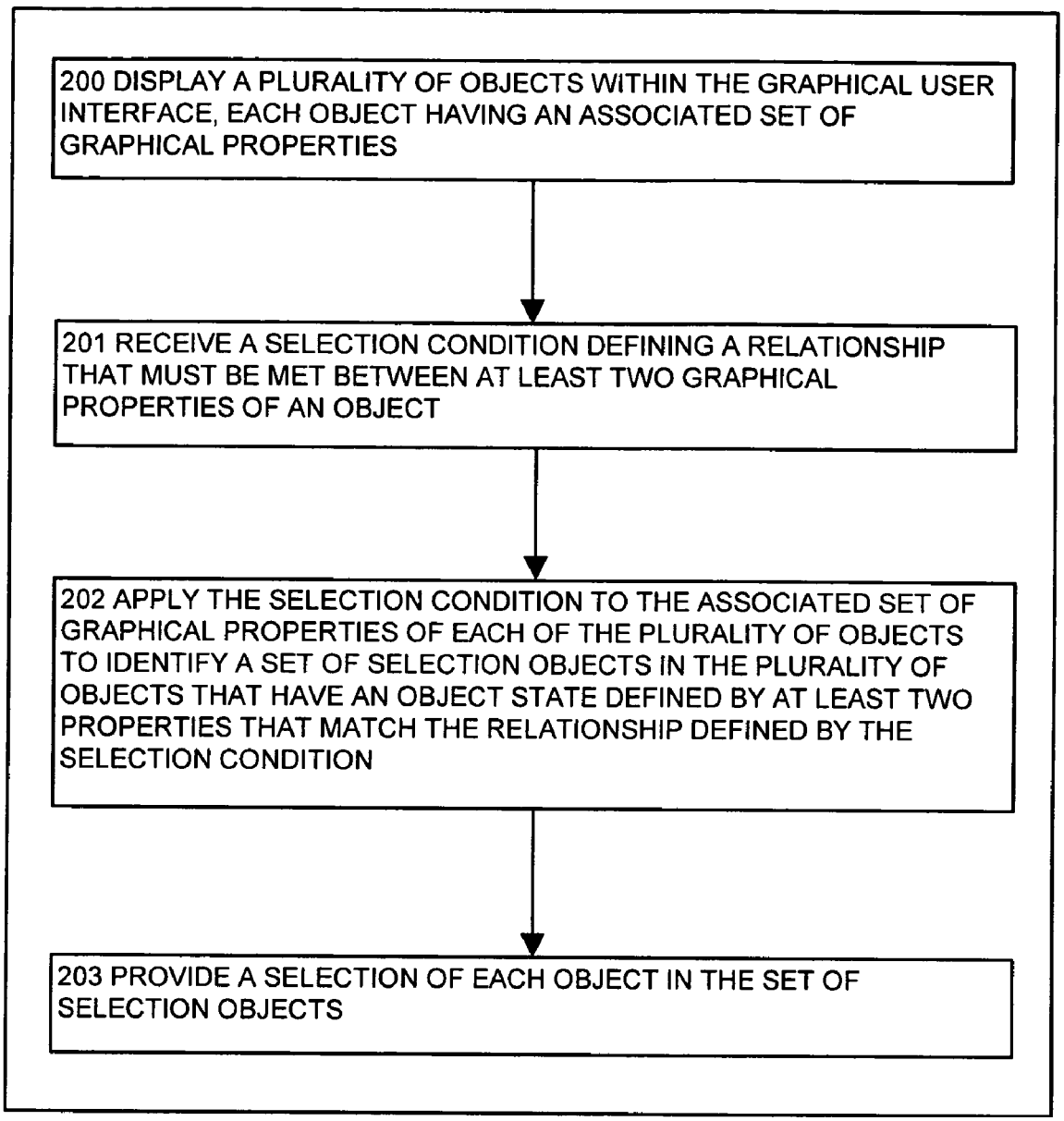
FIG. 4 illustrates a flowchart of a procedure performed by the system of FIG. 1 when the object selecting process displays a plurality of objects within the graphical user interface, each object having an associated set of properties, according to one embodiment disclosed herein.

FIG. 4 is a flowchart of the steps performed by the object selecting process 140-2 when it displays a plurality of objects 125 within the graphical user interface 160, each object 170-N having an associated set of properties. The object selecting process 140-2 receives a selection condition 135 defining a relationship that must be met between properties of an object. The object selecting process 140-2 applies the selection condition 135 to the associated set of properties of each of the plurality of objects 125 to identify a set of selection objects 120 in the plurality of objects 125 that have an object state, and then provides a selection of each objects within the set of selection objects 120. An object state is defined by properties that match the relationship defined by the selection condition.

In step 200, the object selecting process 140-2 displays a plurality of objects 125 within the graphical user interface 160, each object 170-N having an associated set of properties. For example, the properties could include a text object 145, a text container object 150, or a button object 155.

In step 201, the object selecting process 140-2 receive a selection condition 135 defining a relationship that must be met between at properties of an object 170-N. The selection condition 135 could be, for example, "select all oversized objects" or "select all undersized objects". An example of an oversized object 170-N could be a text container object 150 that is too large for the text object 145 contained within that text container object 150. An example of an undersized object could be a button container 155 that is too small for the text object 145 contained within that button container 155. This results in the text within the button container 155 being only partially visible to a user 108.

In step 202, the object selecting process 140-2 applies the selection condition 135 to the associated set of properties of each of the plurality of objects 125. The selection condition 135 is applied to identify a set of selection objects within the plurality of objects 125 that have an object state. The object state is defined by properties that match the relationship defined by the selection condition 135.

In step 203, the object selecting process 140-2 provides a selection of each object in the set of selection objects 120. The object selecting process 140-2 identifies those objects 170-N within the plurality of objects 125 that match the selection condition 135.

Figure 5:
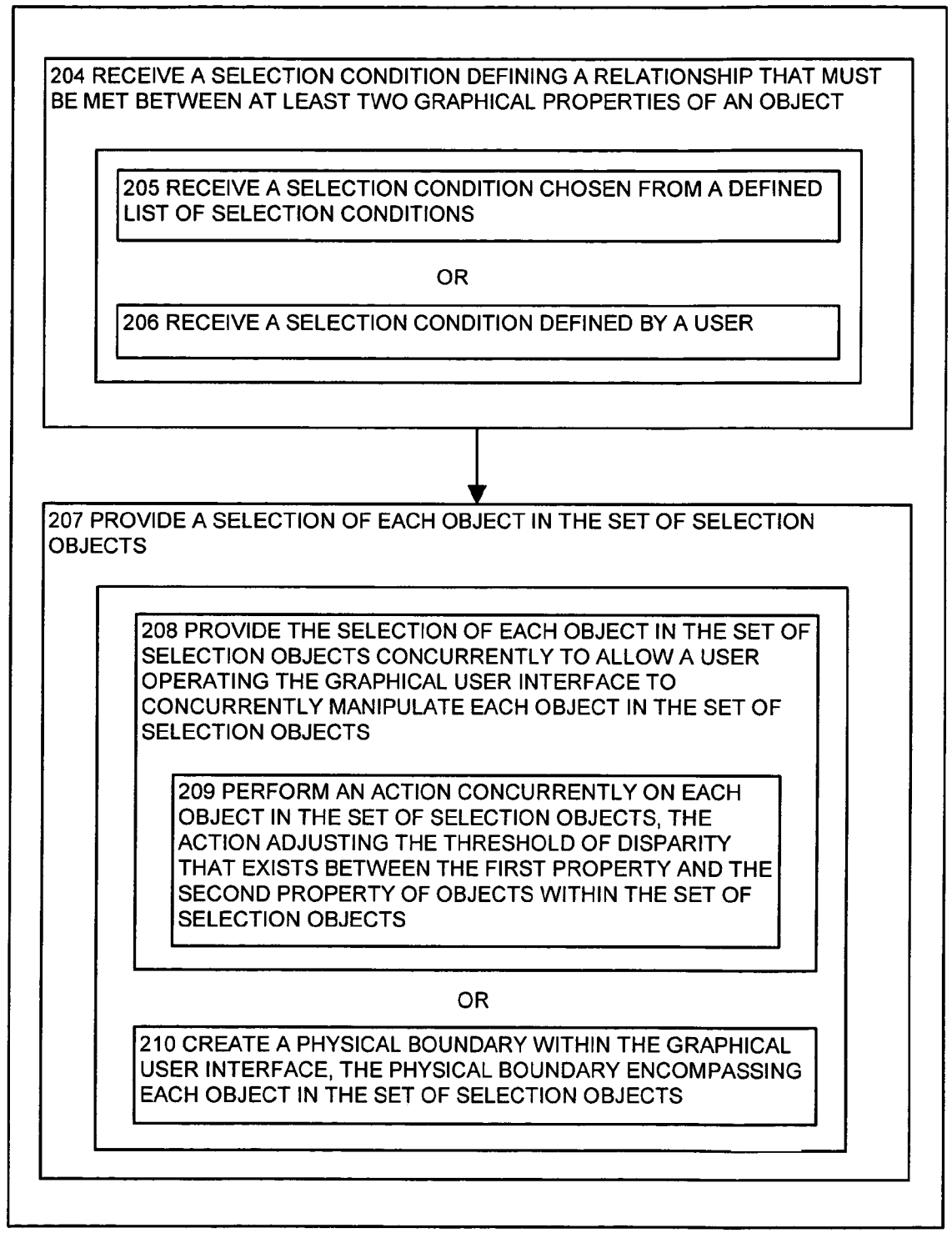
FIG. 5 illustrates a flowchart of a procedure performed by the system of FIG. 1 when the object selecting process receives a selection condition defining a relationship that must be met between properties of an object, according to one embodiment disclosed herein.

FIG. 5 is a flowchart of the steps performed by the object selecting process 140-2 when it receives a selection condition 135 defining a relationship that must be met between properties of an object 170-N. In an example configuration, a user 108 supplies the selection condition 135.

In step 205, the object selecting process 140-2 receives a selection condition 135 chosen from a defined list of selection conditions 135. In an example configuration, the selection conditions 135 are provided to a user 108 via drop down menu. These selection conditions 135 are pre-defined, and available to the user 108, for example, within a document editor 128.

In step 206, the object selecting process 140-2 receives a selection condition 135 defined by a user 108. In an example configuration, a user 108 has the ability to define, and customize the selection conditions 135. The selection condition 135 defines a relationship that must be met between properties of an object 170-N.

In step 207, as previously explained in step 203, the object selecting process 140-2 provides a selection of each object in the set of selection objects 120. Further details regarding providing the set of selection objects 120 are explained within the sub steps of 208, 209, and 210.

In step 208, the object selecting process 140-2 provides the selection of each object in the set of selection objects 120 concurrently. This allows a user 108, operating the graphical user interface 160, to concurrently manipulate each object in the set of selection objects 120. By providing the set of selection objects 120 concurrently, the object selecting process 140-2 allows a user 108 specify an action to be performed on each object in the set of selection objects 120 without the user 108 having to individually perform that action on each object in the set of selection objects 120.

In step 209, the object selecting process 140-2 performs the action (i.e., the action specified by a user 108) concurrently on each object in the set of selection objects 120. The action adjusts a threshold of disparity that exists between a first property and a second property of objects within the set of selection objects 120. The threshold of disparity will be further explained within the sub steps of 215 and 216.

Alternatively, in step 210, the object selecting process 140-2 creates a physical boundary 175 within the graphical user interface 160, the physical boundary 175 encompassing each object in the set of selection objects 120. The physical boundary 175 identifies those objects 170-N that matched the selection condition 135, thereby becoming the set of selection objects 120. This physical boundary 175 allows a user 108 to easily distinguish those objects 170-N that are identified in the set of selection objects 120.

Figure 6:
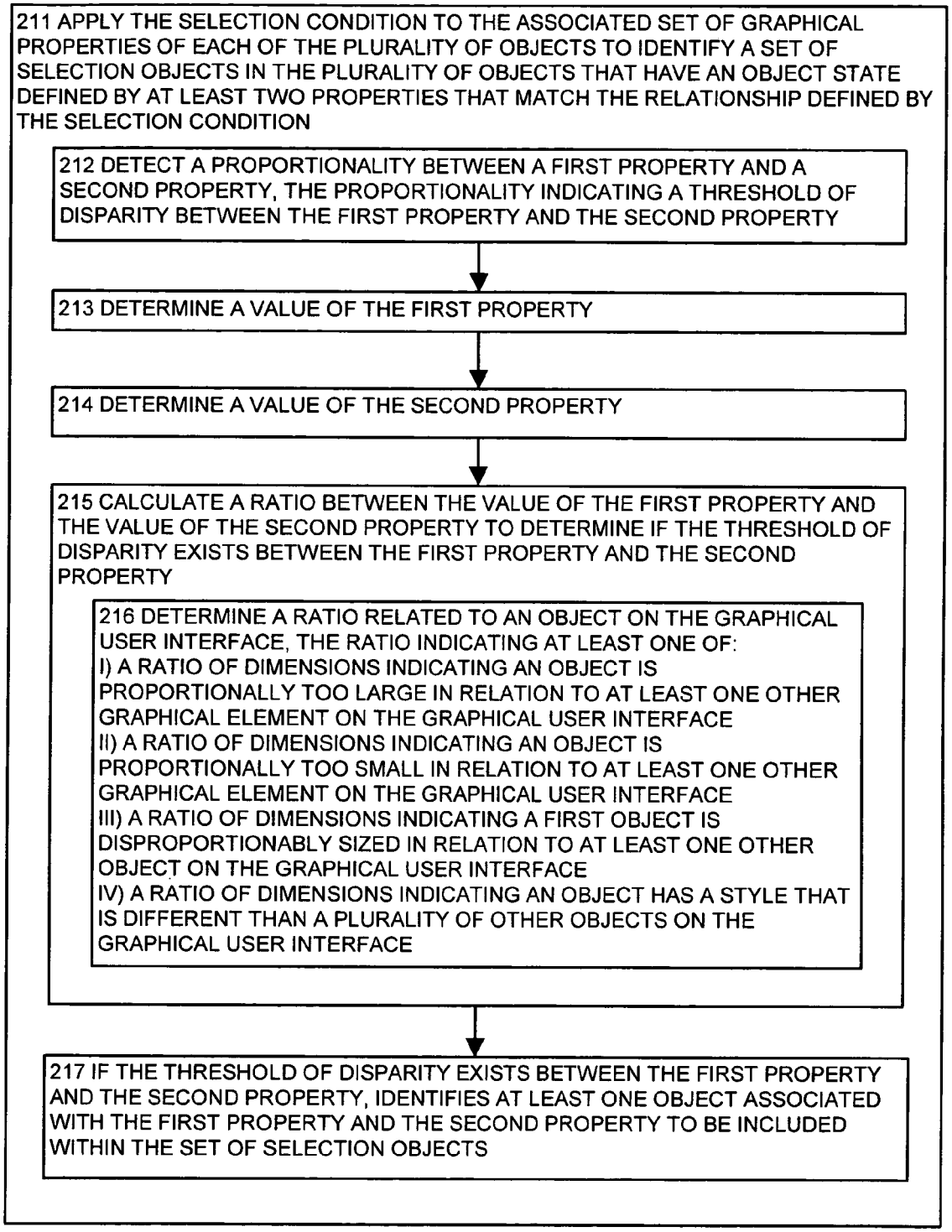
FIG. 6 illustrates a flowchart of a procedure performed by the system of FIG. 1 when the object selecting process applies the selection condition to the associated set of properties of each of the plurality of objects to identify a set of selection objects in the plurality of objects that have an object state defined by properties that match the relationship defined by the selection condition, according to one embodiment disclosed herein.

FIG. 6 is a flowchart of the steps performed by the object selecting process 140-2 when it applies the selection condition 135 to the associated set of properties of each of the plurality of objects 125. The object selecting process 140-2 applies the selection condition 135 to identify a set of selection objects 120 in the plurality of objects 125 that have an object state defined by properties that match the relationship defined by the selection condition 135.

In step 212, the object selecting process 140-2 detects a proportionality between a first property and a second property (and possibly other properties, depending on the complexity of the selection condition) of an object 170-1 or of multiple objects 170-N. The proportionality indicates a threshold of disparity between the first property and the second property. In other words, the proportionality is a value that is the result of a comparison of the properties of one or more objects in accordance with a comparison algorithm or processing. For example, the first property could be a text object 145, and the second property could be a text container object 150. Or, the first property could be a text object 145, and the second object could be a button object 155. In an example configuration, the first and second property could be associated with the same object 170-1 within the plurality of objects 125 within the graphical user interface 160. For example, the first property could be a text object 145 that is too large for the text container object 150 (i.e., the second property) in which the text object 145 resides. Or, in another example configuration, the first property is associated with a first object 170-1 within the plurality of objects 125, and the second property is associated with a second object 170-2 within the plurality of objects 125 within the graphical user interface 160. For example, the first property could be a text container object 145 that is too close to a button object 155. In this example, each property is associated with a different object 170-1 and 170-2.

In step 213, the object selecting process 140-2 determines a value of the first property. In the example of a first property being a text object 145 that is too large for the text container object 150 (i.e., the second property) in which the text object 145 resides, the value of the first property could be an area encompassed by the text object 145.

In step 214, the object selecting process 140-2 determines a value of the second property. In the example of a first property being a text object 145 that is too large for the text container object 150 (i.e., the second property) in which the text object 145 resides, the value of the second property could be an area contained within the text container object 150.

In step 215, the object selecting process 140-2 calculates a ratio between the value of the first property and the value of the second property to determine if the threshold of disparity exists between the first property and the second property. In the example of a first property being a text object 145 that is too large for the text container object 150 (i.e., the second property) in which the text object 145 resides, the ratio calculated would indicate, for example, if the area of the text object 145 was larger than the area of the text container object 150 (i.e., indicating the text object 145 is too large for the text container object 150). The ratio calculated could also indicate that there is not enough of a proportionality between the two areas (i.e., the area of the text object 145 and the text container object 150), meaning the text object 145 might technically fit within the text container object 150, but might have a 'squashed' appearance because there is not enough white space between the text object 145 and the text container object 150.

In step 216, the object selecting process 140-2 determines a ratio related to an object 170-N on the graphical user interface 160. In one configuration, the ratio indicates at least one of the following four scenarios.

i) A ratio of dimensions indicating an object 170-1 is proportionally too large in relation to at least one other graphical element on the graphical user interface 160. For example, a text object 145 might be proportionally too large in relation to the button object 155 in which the text object 145 resides.

ii) A ratio of dimensions indicating an object 170-1 is proportionally too small in relation to at least one other graphical element on the graphical user interface 160. For example, a text object 145 might be proportionally too small in relation to the text container object 150 in which the text object 145 resides, giving the text container object 150 an unbalanced appearance.

iii) A ratio of dimensions indicating a first object 170-1 is disproportionably sized in relation to at least one other object 170-2 on the graphical user interface 160. For example, a graphical user interface 160 containing a grouping of button objects 155 would not appear symmetrical if one of the button objects 155 was unnecessarily small in comparison to all the other button objects 155.

iv) A ratio of dimensions indicating an object 170-1 has a style that is different than a plurality of other objects 125 on the graphical user interface 160. For example, a graphical user interface 160 containing a grouping of text container objects 150 would not appear visually consistent if one of the text container objects 150 contained a text object 145 that was of a different font and font size than the text objects 145 contained within the other text container objects 150 within the grouping of text object containers 150.

If the threshold of disparity exists between the first property and the second property, in step 217, the object selecting process 140-2, identifies at least one object 170-1 associated with the first property and the second property to be included within the set of selection objects 120.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method of selecting objects within a graphical user interface in which at least one computer system accesses instructions from computer storage and executes the instructions to perform steps comprising:

identifying a plurality of objects displayed within the graphical user interface, each object having an associated set of properties defining an object state for that object;

receiving a selection condition defining a relationship to be met between properties of an object;

applying the selection condition to the associated set of properties of each of the plurality of objects to identify a set of selection objects in the plurality of objects that have an object state that matches the relationship defined by the selection condition, wherein applying the selection condition includes: detecting a proportionality that indicates a threshold of disparity between a first property and a second property; and identifying each object in the set of selection objects, wherein identifying each object includes: providing concurrent selection of each object in the set of selection objects to allow a user operating the graphical user interface to perform an action to concurrently adjust the threshold of disparity that exists between the first property and the second property of objects within the set of selection objects.

2. The computer-implemented method of claim 1 wherein detecting a proportionality between a first property and a second property comprises:

determining a value of the first property;

determining a value of the second property;

calculating a ratio between the value of the first property and the value of the second property to determine if the threshold of disparity exists between the first property and the second property; and if the threshold of disparity exists between the first property and the second property, identifying at least one object associated with the first property and the second property to be included within the set of selection objects.

3. The computer-implemented method of claim 2 wherein calculating a ratio between the value of the first property and the value of the second property to determine if the threshold of disparity exists between the first property and the second property comprises:

determining a ratio related to an object on the graphical user interface, the ratio indicating at least one of:

i) a ratio of dimensions indicating an object is proportionally too large in relation to at least one other graphical element on the graphical user interface;

ii) a ratio of dimensions indicating an object is proportionally too small in relation to at least one other graphical element on the graphical user interface;

iii) a ratio of dimensions indicating a first object is disproportionably sized in relation to at least one other object on the graphical user interface; and iv) a ratio of dimensions indicating an object has a style that is different than a plurality of other objects on the graphical user interface.

4. The computer-implemented method of claim 2 wherein the first property and the second property are associated with the same object within the plurality of objects within the graphical user interface.

5. The computer-implemented method of claim 2 wherein the first property is associated with a first object within the plurality of objects and the second property is associated with a second object within the plurality of objects within the graphical user interface.

6. The computer-implemented method of claim 1 wherein identifying each object in the set of selection objects comprises:

creating a physical boundary within the graphical user interface, the physical boundary encompassing each object in the set of selection objects; and providing an automatic selection on the graphical user interface of each object in the set of selection objects so that a user can visualize which objects conform to the selection condition.

7. A computerized device comprising:

a memory;

a processor;

a communications interface;

an interconnection mechanism coupling the memory, the processor and the communications interface;

wherein the memory is encoded with an object selecting application that when executed on the processor selects objects on the computerized device by performing the operations of:

identifying a plurality of objects displayed within the graphical user interface, each object having an associated set of properties defining an object state for that object;

receiving a selection condition defining a relationship to be met between properties of an object;

applying the selection condition to the associated set of properties of each of the plurality of objects to identify a set of selection objects in the plurality of objects that have an object state that matches the relationship defined by the selection condition, wherein applying the selection condition includes: detecting a proportionality that indicates a threshold of disparity between a first property and a second property; and identifying each object in the set of selection objects, wherein identifying each object includes: providing concurrent selection of each object in the set of selection objects to allow a user operating the graphical user interface to perform an action to concurrently adjust the threshold of disparity that exists between the first property and the second property of objects within the set of selection objects.

8. The computerized device of claim 7 wherein when the computerized device performs the operation of detecting a proportionality between a first property and a second property, the computerized device performs the operations of:

determining a value of the first property;

determining a value of the second property;

calculating a ratio between the value of the first property and the value of the second property to determine if the threshold of disparity exists between the first property and the second property; and if the threshold of disparity exists between the first property and the second property, identifying at least one object associated with the first property and the second property to be included within the set of selection objects.

9. The computerized device of claim 8 wherein when the computerized device performs the operation of calculating a ratio between the value of the first property and the value of the second property to determine if the threshold of disparity exists between the first property and the second property, the computerized device performs the operations of:

determining a ratio related to an object on the graphical user interface, the ratio indicating at least one of:
  i) a ratio of dimensions indicating an object is proportionally too large in relation to at least one other graphical element on the graphical user interface;
  ii) a ratio of dimensions indicating an object is proportionally too small in relation to at least one other graphical element on the graphical user interface;
  iii) a ratio of dimensions indicating a first object is disproportionably sized in relation to at least one other object on the graphical user interface; and
  iv) a ratio of dimensions indicating an object has a style that is different than a plurality of other objects on the graphical user interface.

10. The computerized device of claim 7 wherein when the computerized device performs the operation of identifying each object in the set of selection objects, the computerized device performs the operation of:
  creating a physical boundary within the graphical user interface, the physical boundary encompassing each object in the set of selection objects.

11. A computer readable medium encoded with computer programming logic that when executed on a process in a computerized device produces a content rendering process that renders content by causing the computerized device to perform the operations of:
  identifying a plurality of objects displayed within the graphical user interface, each object having an associated set of properties defining an object state for that object;
  receiving a selection condition defining a relationship to be met between properties of an object;
  applying the selection condition to the associated set of properties of each of the plurality of objects to identify a set of selection objects in the plurality of objects that have an object state that matches the relationship defined by the selection condition, wherein applying the selection condition includes: detecting a proportionality that indicates a threshold of disparity between a first property and a second property; and
  identifying each object in the set of selection objects, wherein identifying each object includes: providing concurrent selection of each object in the set of selection objects to allow a user operating the graphical user interface to perform an action to concurrently adjust the threshold of disparity that exists between the first property and the second property of objects within the set of selection objects.

12. The computer-implemented method as in claim 1, wherein detecting a proportionality that indicates a threshold of disparity between a first property and a second property includes:
  identifying an object having an object state resulting from a first property of the object and a second property of the object are currently experiencing the relationship defined by the selection condition.

13. The computer-implemented method as in claim 12, wherein identifying the object having the object state resulting from a first property of the object and a second property of the object are currently experiencing the relationship defined by the selection condition includes:
  detecting a first relationship falls within the threshold of disparity, the first relationship currently existing amongst properties of a rendered first object displayed in a document editor; and
  detecting a second relationship falls within the threshold of disparity, the second relationship currently existing amongst properties of a rendered second object displayed in the document editor; the properties of the rendered first object differ from the properties of the rendered second object.

14. The computer-implemented method as in claim 13, wherein detecting the first relationship and the second relationship includes:
  detecting the first relationship and the second relationship both concurrently fall within the threshold of disparity while a dimensional appearance of the rendered first object is different than a dimensional appearance of the rendered second object.

15. The computer-implemented method as in claim 1, wherein detecting a proportionality that indicates a threshold of disparity between a first property and a second property includes:
  detecting a first object state based on a first relationship falling within the threshold of disparity, the first relationship currently existing between a first property and a second property of a first object, the first property and the second property of the first object respectively defined according to at least one requirement of a first object type; and
  detecting a second object state based on a second relationship falling within the threshold of disparity, the second relationship currently existing between a first property and a second property of a second object, the first property and the second property of the second object respectively defined according to at least one requirement of a second object type, the first object type different than the second object type.

16. The computer-implemented method as in claim 15, comprising:
  wherein the first object type defines a first graphical user interface (G.U.I.) object that receives first user-created content and displays the first user-created content; and
  wherein the second object type defines a second graphical user interface (G.U.I.) object that receives second user-created content and displays the second user-created content.

17. The computer-implemented method as in claim 15, comprising:
  detecting the first relationship falls within the disparity of threshold according to a first extent; and
  detecting the second relationship falls within the disparity of threshold according to a second extent, the first extent unequal to the second extent.

18. The computer-implemented method as in claim 15, comprising:
  wherein the first object state results in a size of a rendered instance of the first object as being substantially too large for content displayed within the rendered instance of the first object; and
  wherein the second object state results in a size of a rendered instance of the second object as being substantially too large for content displayed within the rendered instance of the second object.

19. The computer-implemented method as in claim 15, comprising:
  wherein the first object state results in a size of a rendered instance of the first object as being substantially too small for content displayed within the rendered instance of the first object; and
  wherein the second object state results in a size of a rendered instance of the second object as being substantially too small for content displayed within the rendered instance of the second object.

20. The computer-implemented method as in claim 15, wherein modifying the object state includes:

creating a first new object state for the first object by adjusting the first relationship between the first property and the second property of the first object, an adjusted first relationship no longer within the threshold of disparity; and creating a second new object state for the second object by adjusting the second relationship between the first property and the second property of the second object, an adjusted second relationship no longer within the threshold of disparity.

21. The computer-implemented method as in claim 15, wherein identifying the set of selection objects includes:

including the first object and the second object in the set of selection objects based on detection of the respective first object state and the second object state while the first object comprises a different object type than the second object, the first object and the second object concurrently displayed in a document editor application.

22. The computer implemented method as in claim 1, comprising:

wherein a rendering of the first selection object results in a visual indication of the threshold of disparity occurring between at least one dimensional property of the first selection object and user-created content displayed within the first selection object;

wherein a rendering of the second selection object results in a visual indication of the threshold of disparity occurring between at least one dimensional property of the second selection object and user-created content displayed within the second selection object, the dimensional property of the first selection object different than the dimensional property of the second selection object; and wherein providing concurrent selection of each object in the set of selection objects includes: concurrently eliminating the visual indication of the threshold of disparity with respect to the first selection object and the second selection object.

\* \* \* \* \*